US012775317B2

(12) United States Patent
Zlotnik

(10) Patent No.: US 12,775,317 B2
(45) Date of Patent: Oct. 27, 2026

(54) THERMAL CONTROL SYSTEM ON CHIP

(71) Applicant: Micron Technology, Inc., Boise, ID (US)

(72) Inventor: Leon Zlotnik, Camino, CA (US)

(73) Assignee: Micron Technology, Inc., Boise, ID (US)

( * ) Notice: Subject to any disclaimer, the term of this patent is extended or adjusted under 35 U.S.C. 154(b) by 288 days.

(21) Appl. No.: 18/439,255

(22) Filed: Feb. 12, 2024

(65) Prior Publication Data

US 2024/0281042 A1 Aug. 22, 2024

Related U.S. Application Data

(60) Provisional application No. 63/446,580, filed on Feb. 17, 2023.

(51) Int. Cl.
*G06F 1/20* (2006.01)

(52) U.S. Cl.
CPC .................................... *G06F 1/206* (2013.01)

(58) Field of Classification Search
CPC ....................................................... G06F 1/206
See application file for complete search history.

(56) References Cited

U.S. PATENT DOCUMENTS 7,596,430 B2 9/2009 Aguilar, Jr. et al.
7,695,188 B2 4/2010 Sri-Jayantha et al.
8,572,535 B2 10/2013 Rahmat et al.
8,786,449 B1 * 7/2014 Kraipak .................. G06F 1/206 702/132
2012/0209559 A1 * 8/2012 Brower .................. G05B 15/02 327/512
2015/0241887 A1 * 8/2015 Brower .................. G05B 15/02 700/299
2015/0350407 A1 * 12/2015 Hsu ................... H04M 1/72454 455/418
2018/0210522 A1 * 7/2018 Jain ........................ G06F 9/4893
2020/0081507 A1 * 3/2020 Nowell .................. G01K 3/005
2020/0168255 A1 * 5/2020 Lingambudi ......... G06F 3/0604

FOREIGN PATENT DOCUMENTS

TW 1410783 B * 10/2013 ............... G11C 7/04

* cited by examiner

*Primary Examiner* — Suresh Suryawanshi
(74) *Attorney, Agent, or Firm* — Brooks, Cameron & Huebsch, PLLC

(57) ABSTRACT

A method includes measuring, by a plurality of thermal sensors coupled to a plurality of circuit portion areas of a memory sub-system, temperature information associated with the plurality of circuit portion areas. The method further includes generating a thermal map based on the measured temperature information associated with the plurality of circuit portion areas and determining, based on the thermal map, that at least one of the circuit portion areas has greater than a threshold probability of experiencing a thermal event. The method further includes operating processing circuitry coupled to the plurality of circuit portion areas to mitigate a thermal load associated with the at least one of the circuit portion areas that has greater than the threshold probability of experiencing the thermal event.

18 Claims, 5 Drawing Sheets

THERMAL CONTROL SYSTEM ON CHIP

PRIORITY INFORMATION

This Application claims the benefit of U.S. Provisional Application No. 63/446,580, filed on Feb. 17, 2023, the contents of which are incorporated herein by reference.

TECHNICAL FIELD

Embodiments of the disclosure relate generally to digital logic circuits, and more specifically, relate to a thermal control system on chip.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
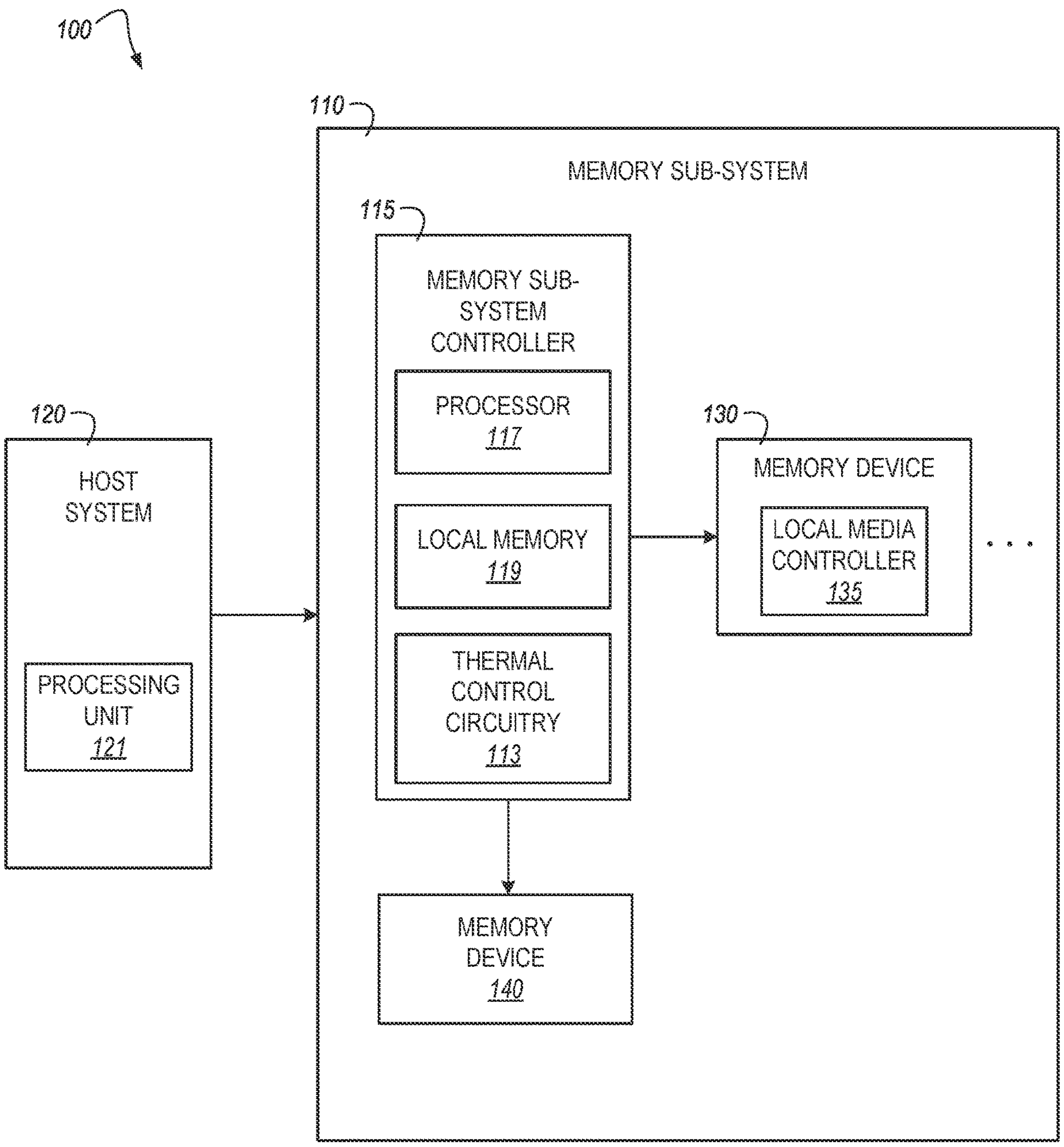
FIG. 1 illustrates an example computing system that includes a memory sub-system in accordance with some embodiments of the present disclosure.

Aspects of the present disclosure are directed to a thermal control system on chip and, in particular, to memory sub-systems that provide a thermal control system on chip. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation of a memory sub-system, components (e.g., silicon chips, dice, packages, partitions, IP cores, application-specific integrated circuits, field-programmable gate arrays, memory devices, power supplies, etc.), which may be referred to in the alternative as "partitions" or "circuit portion areas," herein, of the memory sub-system may fluctuate. For example, as components of the memory sub-system are operated, the temperatures of such components can be altered (e.g., can increase or can decrease). As the power provided to the components increases, the temperature of these components may also increase, and an amount power leakage may also increase as well.

In some approaches, these temperature alterations are generally detected by temperature (or thermal) sensors that are deployed on one or more of the components of the memory sub-system. In general, the larger the system (e.g., the greater the quantity of components, the greater the physical area taken up by the components, etc.), the greater the quantity of temperature sensors that are utilized. In such approaches, the temperature sensors are configured to determine an average temperature for all the components of the memory sub-system and/or an individual component of the memory sub-system. Once this average temperature is determined, a decision as to whether or not to perform a protective action (e.g., whether or not to perform a thermal throttling operation to reduce the average temperature, whether or not a thermal trip has occurred in which an alarm or other indication that the temperature has reached greater than a threshold temperature is generated, etc.) is made. This decision is generally made reactively (i.e., after the average temperature has reached some average temperature threshold) and can be performed by, for example, firmware running on the memory sub-system.

In addition to the added complexity (e.g., additional physical components, wires, etc.) incurred by increasing the quantity of temperature sensors as the quantity of components increases, the above and other approaches may further fail to account for the changes in temperature associated with operation of the components by applying a single voltage value (e.g., a voltage having a particular value) to all (or most) of the components of the memory sub-system based on the average temperature or average temperature threshold. Although this may simplify voltage management in the memory sub-system, higher than necessary power may be consumed during operation of the memory sub-system in such approaches. Moreover, in such approaches, at least some components may still experience higher than optimal operating temperatures, particularly when the topographical layout of the temperature sensors favors sensors in generally cooler or warmer areas of the memory sub-system.

These and other deficiencies of such approaches can be further exacerbated by the reactive nature of preventative operations prevalent in these approaches. For example, approaches that perform thermal throttling operations reactively (e.g., after an average temperature of multiple components as detected by the temperature sensors has reached some average temperature threshold) may not account for higher than optimal operating temperatures experienced by some of the components (e.g., components at physical locations in the memory sub-system that may be more prone to thermal disturbances, components that are not adequately provided with temperature sensors, etc.), thereby allowing these components to be subjected to greater than expected or wanted temperatures. Conversely, approaches that perform thermal throttling operations reactively may not account for lower than optimal operating temperatures experienced by some of the components (e.g., components at physical locations in the memory sub-system that may be less prone to thermal disturbances, components that are over provisioned with temperature sensors, etc.), thereby allowing these components to underperform when thermally throttled. Further, approaches that perform thermal throttling operations reactively may not be able to address thermal disturbances that have not yet occurred, thereby leading to scenarios where reactive over-correction is employed, which may unnecessarily limit the performance of the components of the memory sub-system and, accordingly, performance of the memory sub-system as a whole.

In order to address these and other deficiencies of current approaches, embodiments of the present disclosure provide a thermal control system on chip including thermal control circuitry to determine temperature gradients and temporal gradients associated with components of a memory sub-system. The thermal control system on chip (SoC) provides preemptive thermal throttling to such components in the event that the determined temperature gradients and/or temporal gradients indicate that thermal characteristics of one or more of the components will approach or will meet a temperature threshold. As described in more detail herein, the thermal control SoC can analyze the thermal behavior of multiple components (some of which may or may not include temperature sensors), generate a thermal map of one or more components of the memory sub-system, predict thermal behavior of the analyzed components, and/or pre-emptively perform thermal throttling operations for the components based on one or more of the foregoing criteria. Although generally described herein as "temperature sensors" or "thermal sensors," it will be appreciated that other types of sensors, such as voltage sensors, current sensors, etc. can be utilized by the thermal control SoC to analyze the thermal behavior of the components of the memory sub-system in accordance with the disclosure.

In some embodiments, the temporal gradients can be used in connection with the thermal gradients to allow for pre-emptive performance of a thermal throttling operation. For example, embodiments herein allow for the thermal behavior (e.g., using the thermal gradients) of the components to be analyzed in time thereby allowing for a more robust insight into the actual thermal behavior of the components in real time. Further, analysis of the temporal gradients can provide insight into future thermal behavior of the components because the thermal behavior of one or more components, such as an "aggressor" component that is exhibiting a large thermal gradient, can eventually have a thermal impact on one or more physically proximate components as heat waves generated by the "aggressor" component travel across a die on which the components are deployed. However, the heat waves may travel at speeds that are slow enough that, by analyzing the temporal gradients, sufficient time to preemptively perform a thermal throttling operation to, at minimum, the "aggressor" component can allow for adverse thermal effects to be mitigated for other components in memory sub-system.

In some embodiments, performing a thermal throttling operation can include causing one or more voltage regulators associated with the memory sub-system to output a modified voltage. As used herein, a "modified voltage" generally refers to a voltage signal (e.g., generated by the voltage regulator) that provides a different voltage level than a voltage signal generated prior to processing of signals from the thermal control circuitry. For example, if the voltage regulator is generating an initial voltage signal that corresponds to X volts during normal operation and the voltage regulator receives the signals from the thermal control circuitry indicating that the voltage regulator is to generate a voltage signal that corresponds to Y volts, the modified voltage can be the voltage Y. The modified voltage can be greater than the initial voltage (e.g., $Y>X$) or the modified voltage can be less than the initial voltage (e.g., $Y<X$). For example, to remediate a detected voltage overshoot (e.g., a situation in which too great of a voltage is supplied to the memory sub-system), the modified voltage can be less than the initial voltage. Similarly, to remediate a voltage undershoot (e.g., a situation in which too small of a voltage is supplied to the memory sub-system), the modified voltage can be less than the initial voltage.

In addition to, or in the alternative to causing one or more voltage regulators to output a modified voltage, performing a thermal throttling operation can include causing timing circuitry (e.g., the clock circuitry 214 of FIG. 2) to alter a clocking frequency provided to one or more components of the memory sub-system to provide a "modified clocking frequency" to one or more components of the memory sub-system. As used herein, a "modified clocking frequency" generally refers to a clock signal (e.g., generated by the clock circuitry) that provides a different clocking frequency than a clock signal generated prior to processing of signals from the thermal control circuitry. For example, if the clock circuitry is generating an initial clock signal that corresponds to a clocking frequency $\tau$ during normal operation and the clock circuitry receives the signals from the thermal control circuitry indicating that the clock circuitry is to generate a clocking signal that has a clocking frequency $\varphi$, the modified clocking frequency can have a clock frequency $\varphi$. The modified clocking frequency can be greater than the initial clock frequency (e.g., $\varphi>\tau$) or the modified clocking frequency can be less than the initial voltage (e.g., $\varphi<\tau$). For example, to remediate a scenario in which the temperature of one or more of the components is greater than (or will be greater than) a temperature threshold, the modified clocking frequency can be less than the initial clock frequency.

In some embodiments, the thermal control circuitry can be operated as described herein to reduce an amount of power consumed by various components of the memory sub-system while still providing an adequate amount of voltage or current to maintain functionality of the components of the memory sub-system. In particular, although power consumption in a memory sub-system tends to increase exponentially as the temperature of the silicon chips, dice, and/or components increase, such silicon chips, dice, and/or components may still fully function if the voltage or current is reduced (e.g., trimmed). Embodiments of the present disclosure exploit this phenomenon by providing a modified voltage to silicon chips, dice, and/or components of the memory sub-system based on a determined temperature of the silicon chips, dice, and/or components (among other information) to reduce power consumption in the memory sub-system.

By utilizing thermal control circuitry that receives information from various voltage sensors, current sensors, and/or temperature sensors in the memory sub-system, as well as information corresponding to quality characteristics of one or more silicon chips, dice, components, etc. of the memory sub-system, to send signals to the voltage regulator to cause the voltage regulator to output a modified voltage, thermal control in accordance with the present disclosure can be provided only as needed (e.g., in response to signaling generated by the voltage management circuitry). That is, by utilizing embodiments of the present disclosure, thermal control to provide a voltage boost (or reduction) or a current boost (or reduction) to components of the memory sub-system as needed, thereby yielding power savings (e.g., a reduction in power consumed by the memory sub-system) and, accordingly, an improvement to the memory sub-system, in comparison to the approaches described above. In addition, heat generation in the memory sub-system is reduced in comparison to the approaches described above thereby reducing the quantity and/or size of thermal dissipation components in the memory sub-system thereby yielding further improvements to the memory sub-system. Further, overall performance of a memory sub-system which employs aspects of the disclosure is improved without the need for increased power consumption in contrast to previous approaches.

Further, embodiments herein for temperature phenomena that result from temperature inversion effects to be dynamically addressed. Traditionally, hotter temperatures of various circuit components generally resulted in a lower speed (e.g., processing speed, throughput, etc.). As two-digit nanometer technology became more widespread, various areas (e.g., physical corners of silicon chips, dice, etc.) of such silicon chips, dice, etc. trended to experience two areas (e.g., "corners") that were classified as being "slow" based on the temperature response associated therewith. That is, the hot and the cold "corners" of a silicon chip, die, etc. tended to behave in a manner characterized as "slow" in comparison to "fast" at temperatures that fell between the relatively "hot" and "cold" areas or corners. It is noted that these "slow" corners need not be equally "slow" (e.g., these corners do not necessarily exhibit a same speed) and can have different speeds (e.g., one of these corners can be slower than the other corner). However, embodiments of the present disclosure contemplate single digit nanometer technologies in which lower temperatures (e.g., "cold" areas) are characterized as "slow" in comparison to relatively "hotter" areas that are characterized as being faster than the colder temperature areas. In any case, embodiments herein seek to set an optimized voltage (e.g., the modified voltage generated by the voltage regulator) based on a detected and/or a determined temperature (e.g., the real temperature of the silicon chip, die, etc. during operation of a memory sub-system) and therefore do not generally rely on the inherent behaviors of the areas or corners of the silicon chips, dice, etc.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include thermal control circuitry 113. Although not shown in FIG. 1 so as to not obfuscate the drawings, the thermal control circuitry 113 can include various circuitry to facilitate aspects of the disclosure described herein. In some embodiments, the thermal control circuitry 113 can include special purpose circuitry in the form of an ASIC, FPGA, state machine, hardware processing device, and/or other logic circuitry that can allow the thermal control circuitry 113 to orchestrate and/or perform operations to provide thermal control for a system on chip (SoC) in accordance with the disclosure. For example, the thermal control circuitry 113 can analyze the thermal behavior of components of the memory sub-system 110, generate, based on temperature and temporal gradients determined by the thermal control circuitry 113, a thermal map of one or more components of the memory sub-system 110, predict thermal behavior of the analyzed components, and/or preemptively perform thermal throttling operations for the components based on one or more of the foregoing criteria, as described herein in connection with the forthcoming illustrations.

In some embodiments, the memory sub-system controller 115 includes at least a portion of the thermal control circuitry 113. For example, the memory sub-system controller 115 can include a processor 117 (processing device) configured to execute instructions stored in local memory 119 for performing the operations described herein. In some embodiments, thermal control circuitry 113 is part of the host system 110, an application, or an operating system. The thermal control circuitry 113 can be resident on the memory sub-system 110 and/or the memory sub-system controller 115. As used herein, the term "resident on" refers to something that is physically located on a particular component. For example, the thermal control circuitry 113 being "resident on" the memory sub-system 110, for example, refers to a condition in which the hardware circuitry that comprises the thermal control circuitry 113 is physically located on the memory sub-system 110. The term "resident on" may be used interchangeably with other terms such as "deployed on" or "located on," herein.

Figure 2:
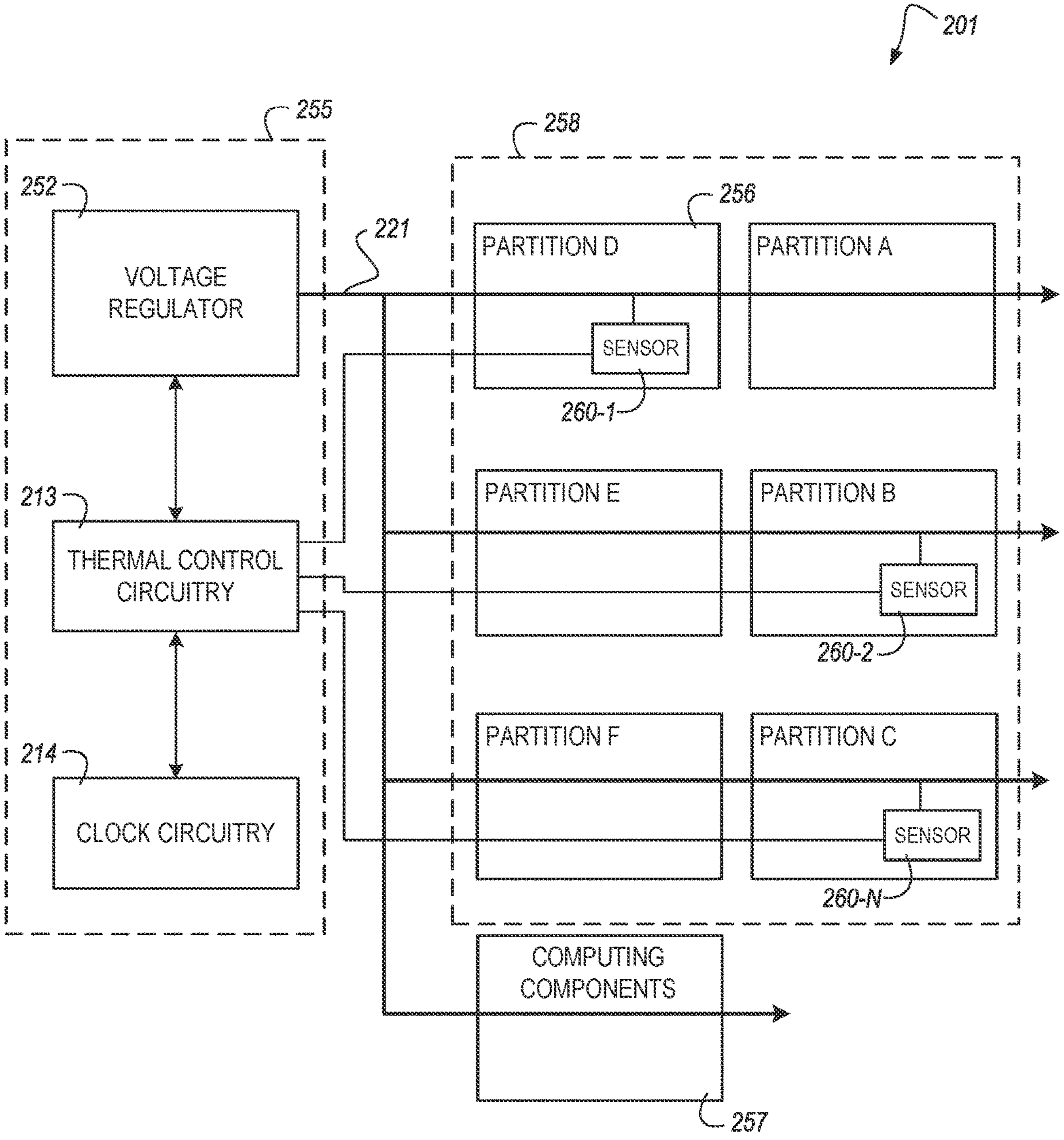
FIG. 2 illustrates an example of a thermal control system on chip in accordance with some embodiments of the present disclosure.

FIG. 2 illustrates an example of a thermal control system on chip (SoC) 201 in accordance with some embodiments of the present disclosure. The example SoC 201, which can be referred to in the alternative as a "system" or as an "apparatus," includes temperature circuitry 255, which includes a voltage regulator 252, and thermal control circuitry 213, and clock circuitry 214. The voltage regulator 252 is coupled to a voltage signal line 221 (e.g., a rail to provide a power supply signal or "supply voltage signal" to one or more electrical components, such as the circuit portion areas 256 and/or the computing components 257). The voltage signal line 221 can be split into one or more voltage supply lines that supply voltage to the circuit portion areas 256 and the computing components 257 of the system 201.

As the voltage signal generated by the main voltage regulator 252 traverses the voltage signal line 221 and provides voltage to the circuit portion areas 256 and/or the computing components 257, temperatures associated with the circuit portion areas 256 and/or the computing components 257 can be altered. For example, the circuit portion areas 256 and/or the computing components 257 can experience higher temperatures in the presence of voltage signals as opposed to in the absence of voltage signals. Further, the longer (e.g., the more prolonged operation of the memory sub-system becomes) the circuit portion areas 256 and/or the computing components 257 are supplied with such voltage signals, the higher the temperatures of the circuit portion areas 256 and/or the computing components 257 can become.

As mentioned above, as the temperature of the circuit portion areas 256 and/or the computing components 257 increases, the amount of power supplied to the circuit portion areas 256 and/or the computing components 257 generally increases, particularly in approaches that operate using voltage signals having a fixed voltage value. In order to alleviate the tendency towards increased power consumption in such scenarios, the sensor circuits 260-1, 260-2 to 260-N (generally referred to as "sensors circuits 260") can monitor the temperature of the circuit portion areas 256 and/or the computing components 257 to determine relatively instantaneous temperatures associated with each respective circuit portion area 256 and/or computing component(s) 257.

Further, as the voltage signal generated by the main voltage regulator 252 traverses the voltage signal line 221, the magnitude of the voltage signal can be reduced, e.g., can experience an IR drop and/or a voltage drop. Accordingly, under some conditions, a "global voltage" signal (e.g., the voltage signal on the rail 221 prior to being split into different voltage supply lines) can have a greater magnitude (e.g., correspond to a larger voltage) than a "local voltage" signal (e.g., the voltage signal by the time it reaches the computing components 257). When the magnitude of the voltage signal is decreased, for example due to an IR drop, an increase in a current associated with the voltage signal can be detected using the sensor circuits 260. Conversely, when the magnitude of the voltage signal is increased, a decrease in the current associated with the voltage signal can be detected using the sensor circuits 260. In some embodiments, the sensor circuits 260 can be voltage sensors that are configured to detect voltages and/or changes in voltages in the system 201. Embodiments are not so limited, however, and in some embodiments, the sensor circuits 260 can be current sensors that are configured to detect currents and/or changes in currents in the system 201, among other possibilities are contemplated within the scope of the disclosure. In general, however, the sensor circuits 260 are described herein as being temperature sensors (or "thermal sensors") that are configured to measure and report temperature information to the thermal control circuity 213, as described in more detail herein.

In FIG. 2, the system 201 includes a circuit area 258 that includes a number of circuit portion areas 256 (e.g., partitions A-F) that have power supplied thereto via the main voltage regulator 252 through voltage supply lines coupled to the voltage supply line 221. The circuit portion areas 256 can be logic blocks that can include various hardware that form one or more cores (e.g., "intellectual property (IP) cores"). As used herein, a "core" or "IP core" generally refers to one or more blocks of data and/or logic that form constituent components of an application-specific integrated circuit or field-programmable gate array. The circuit portion areas can be designed, built, and/or otherwise configured to perform specific tasks and/or functions within the systems described herein. In some embodiments, the main voltage regulator 252 and/or the thermal control circuitry 213 can take an action (or cause an action to be taken) to track, limit, adjust or manipulate the voltage signals applied to the voltage signal line 221 and/or the voltage supply lines coupled to the voltage signal line 221 to provide voltage manipulation to the circuit portion areas 256.

As shown in FIG. 2, the circuit portion areas 256 can include sensor circuits 260. The sensor circuits 260 can include various hardware circuitry and/or circuitry components to detect temperature levels experienced by the circuit portion areas 256 and/or the computing components 257 as a result of application of a voltage applied via the voltage signal line 221 and/or the voltage supply lines coupled to the voltage signal line 221. That is, the sensor circuits 260 can detect thermal characteristics (e.g., temperatures) of the circuit portion areas 256 and/or the computing components 257 during operation of the circuit portion areas 256 and/or the computing components 257.

The sensor circuits 260, in connection with the thermal control circuitry 213, can be configured to generate a thermal map for the circuit portion areas 256 and/or the computing components 257, as described in more detail in connection with FIG. 3, herein. In some embodiments, generating the thermal map can include determining temperature gradients between one or more of the sensor circuits 260 to determine a temperature at one or more locations of the system 201 that is between one or more of the sensor circuits 260.

For example, the sensor circuit 260-1 can measure a first temperature while the sensor circuit 260-2 can measure a second temperature. A thermal gradient (e.g., a continuous change in the temperature between the sensor circuit 260-1 and the sensor circuit 260-2) can be determined based on the first temperature and the second temperature. This thermal gradient can be used to determine, for example, a temperature associated with the partition E and/or the partition A. It is noted that in this particular non-limiting example, the partition E and the partition A are devoid of sensor circuits and therefore do not have the capability to determine their own temperatures. However, by analyzing the thermal gradient based on the temperature information from the sensor circuit 260-1 and the sensor circuit 260-2, it is possible to determine a temperature of the partition E and/or the partition A and, accordingly, determine whether or not to perform a preventative thermal throttling operation involving the partition E and/or the partition A. In some embodiments, this can allow for accurate determination of temperatures of the partitions 256 and/or the computing components 257 while reducing the quantity of sensor circuits 260 deployed on the system 201 in comparison to approaches in which at least one sensor circuit 260 is deployed on each partition 256 and/or each of the computing components 257.

In some embodiments, information corresponding to temperatures (e.g., temperature of the circuit portion areas 256 and/or the computing component(s) 257) can be reported to the thermal control circuitry 213 based on a criticality (e.g., a susceptibility to temperature fluctuations) of such of such components regardless of voltages and/or currents applied to the circuit portion areas 256 and/or the computing component(s) 257. For example, some of the circuit portion areas 256 and/or the computing component(s) 257 may experience higher temperatures and therefore may be deemed more critical than other circuit portion areas 256 and/or the computing component(s) 257 regardless of the voltage(s) applied thereto. Accordingly, embodiments herein allow for information related to these temperatures to be reported to the voltage management circuitry 213. Such information can be processed by the thermal control circuitry 213 and can be used in generating the voltage management control signal 253.

In embodiments in which a modified voltage is generated in response to the circuit portion areas 256 and/or the computing components 257 experiencing elevated temperatures (as detected by the sensor circuits 260, for example), it can be beneficial to modify the voltage to reduce the amount of power consumed by the system 201 (and therefore the temperature of the circuit portion areas 256 and/or the computing components 257). As described herein, this process can be dynamic, as oscillations around a temperature value and/or voltage value can occur due to the dynamic nature of circuit components such as the circuit portion areas 256 and/or the computing components 257. In addition, and in particular with respect to temperatures, it can be the case that particular circuit portion areas 256 and/or computing components 257 can act as “aggressor” components that, by virtue of exhibiting higher temperatures than neighboring components, can cause the neighboring components to increase in temperature as well. Accordingly, aspects of the present disclosure allow for remediation of such characteristics by dynamically monitoring the sensor circuits 260 and providing information to the thermal control circuitry 213 such that the thermal control circuitry 213 and/or the clock circuitry 214 can generate one or more signals to provide a modified clocking signal to the “aggressor” component(s) to cause the temperatures of such “aggressor” components to be reduced. In some embodiments, providing the modified clocking signal to the “aggressor” component(s) can allow for thermal mitigation to be provided to the “aggressor” components without affecting other components in the memory sub-system.

As shown in FIG. 2, the voltage management system 201 can be coupled to one or more computing components 257. Although not explicitly shown in FIG. 2, the computing components 257 can include one or more sensor circuits, which can be analogous to the sensor circuits 260. The computing components 257 are generally external to the temperature circuitry 255 (i.e., the computing components are physically distinct from a chip, such a SoC that, at minimum, the temperature circuitry 255 is deployed on) but are communicatively couplable to the temperature circuitry 255 such that signaling can be exchanged between the temperature circuitry 255 and the computing components. Non-limiting examples of the computing components can include controllers, memory devices, graphics processing units, processors/co-processors, and/or logic blocks, among others that are deployed on a memory sub-system (e.g., the memory sub-system 110 illustrated in FIG. 1, herein) in which the thermal control system 201 operates.

Further, embodiments of the present disclosure can address shortcomings that arise in scenarios in which a system, such as the system 201, are expected to perform within some specific performance vs. power and/or performance vs. temperature requirements (e.g., to provide an expected quality of service or other performance metric expected of a user of the system 201). In some previous approaches, circuit portion area(s) 256 and/or computing component(s) 257 may be operated at a “high” performance level until a certain threshold temperature (e.g., 70° C.) is reached. Such approaches may then throttle overall performance of the circuit portion area(s) 256 and/or computing component(s) 257 to a “medium” performance level while the temperature of such circuit portion area(s) 256 and/or computing component(s) 257 is between 70° C. and 100° C. Once one or more of the circuit portion area(s) 256 and/or computing component(s) 257 have reached a threshold temperature of 100° C., such approaches may further throttle the performance of the circuit portion area(s) 256 and/or computing component(s) 257 to a “low” performance level. In general, the “performance levels” described above relate to a rate (e.g., a speed) at which the circuit portion area(s) 256 and/or computing component(s) 257 process information and/or commands.

In contrast, embodiments described herein allow for a voltage generated by the voltage regulator 252 to be modified, thereby allowing for a wider acceptable temperature range while maintaining an expected performance of the system 201. For example, by reducing the value of the voltage signal (e.g., by supplying a modified voltage signal) generated by the voltage regulator 252 based on the voltage management control signal 253 described herein, it may be possible to continue to operate the circuit portion area(s) 256 and/or computing component(s) 257 at a "high" performance level until the temperature of the circuit portion area(s) 256 and/or computing component(s) 257 reaches a threshold temperature value of 75° C. (or higher). Continuing with this example, embodiments of the present disclosure can allow for a "medium" performance level to be achieved while the temperature of the circuit portion area(s) 256 and/or computing component(s) 257 is between 75° C. and 105° C. Accordingly, the "low" performance level may not be activated until the temperature of the circuit portion area(s) 256 and/or computing component(s) 257 exceeds 105° C.

It is noted that the enumerated temperature values given in the foregoing paragraphs are merely illustrative of a particular scenario and, accordingly, other temperature values and/or ranges will be understood to be contemplated within the scope of the disclosure. For example, embodiments of the present disclosure may operate at the "high" performance level until the temperature of the circuit portion area(s) 256 and/or computing component(s) 257 reaches a threshold temperature value of 74.09° C. (or some other arbitrary temperature value based on the quality characteristics of the circuit portion area(s) 256 and/or computing component(s) 257) and activate the "low" performance level when the temperature of the circuit portion area(s) 256 and/or computing component(s) 257 exceeds 106.01° C. (or some other arbitrary temperature value based on the quality characteristics of the circuit portion area(s) 256 and/or computing component(s) 257). Further, it will be appreciated that the temperature ranges for the various performance levels may differ based on the architecture of a system in which the components described herein operate, workloads experienced by such components, manufacturing characteristics of such components, etc.

In addition, due to trends in modern semiconductor technology whereby increased speed performance of silicon chips and/or dice (and, hence the circuits that are formed by one or more of such silicon chips and/or dice) is demanded, embodiments of the present disclosure allow for the voltage regulator 252 to generate a modified voltage signal based on temperatures detected by the sensor circuitry 260 that may arise due to such increased speeds (e.g., clocking speeds, increased throughput, etc.) experienced by the silicon chips and/or dice of the system 201. For example, embodiments of the present disclosure can detect an increase in a temperature of the circuit portion area(s) 256 and/or computing component(s) 257) that results from the circuit portion area(s) 256 and/or computing component(s) 257) performing operations at a particular speed (e.g., clocking time, quantity of FLOPS performed within a given time period, etc.) and determine that a modified voltage signal should be applied by the voltage regulator 252 in order to reduce power consumption of the system 201 while still allowing for operations to be performed at these increased speeds. That is, because increasing the speed and/or performance of the circuit portion area(s) 256 and/or computing component(s) 257 will generally give rise to a corresponding increase in temperature, embodiments described herein can allow for the modified voltage signal to be generated and applied to the circuit portion area(s) 256 and/or computing component(s) 257 to maintain a same or similar speed while reducing power consumption of the system 201 while reducing the applied voltage via the modified voltage signal.

In a non-limiting example, an apparatus (e.g., the computing system 100 illustrated in FIG. 1, the thermal control circuitry 113/213 illustrated in FIG. 1 and FIG. 2, the thermal control system 201 illustrated in FIG. 2 and/or components thereof), includes a plurality of circuit portion areas 256 resident on a memory sub-system (e.g., the memory sub-system 110 of FIG. 1) and a plurality of thermal sensors 260 coupled to at least some of the plurality of circuit portion areas 256. That is, as described in more detail in connection with FIG. 3, some of the circuit portion areas 256 can include one or more sensors 260, some of the circuit portion areas 256 can be devoid of a sensor 260, and/or one or more of the sensors 260 can be coupled to multiple circuit portion areas 256. Accordingly, there need not be a 1:1 correspondence of sensors 260 and circuit portion areas 256. In some embodiments, the plurality of thermal sensors 260 measure temperature information associated with at least one of the plurality of circuit portion areas 256.

The apparatus further includes processing circuitry (e.g., the thermal control circuitry 213) coupled to the plurality of thermal sensors 260 and the plurality of circuit portion areas 256. The processing device can be configured to generate a thermal map based on the measured temperature information associated with the plurality of circuit portion areas 256, determine, based on the thermal map, that at least one of the circuit portion areas 256 has greater than a threshold probability of experiencing a thermal event, and perform an operation to mitigate a thermal load associated with the at least one of the circuit portion areas 256 that has greater than the threshold probability of experiencing the thermal event.

Continuing with this non-limiting example, the processing circuitry can further include a voltage regulator 252 and the operation to mitigate the thermal load associated with the at least one of the circuit portion areas 256 that has greater than the threshold probability of experiencing the thermal event comprises an operation performed by the voltage regulator 252 to alter a voltage or a current applied to the at least one of the circuit portion areas 256. Embodiments are not so limited, however, and in some embodiments, and the operation to mitigate the thermal load associated with the at least one of the circuit portion areas 256 that has greater than the threshold probability of experiencing the thermal event comprises an operation to alter a clocking frequency applied to the at least one of the circuit portion areas 256 using, for example, the clock circuity 214.

In some embodiments, the processing device can determine that the thermal load is indicative of a workload executed by the at least the one of the circuit portion areas 256 and the operation to mitigate the thermal load associated with the at least one of the circuit portion areas 256 that has greater than the threshold probability of experiencing the thermal event can be an operation to alter a workload allocation to the at least one of the circuit portion areas 256. As used herein, a "workload" generally refers to the aggregate computing resources consumed in execution of applications that perform a certain task, function, and/or activity. During the course of executing an application, multiple sub-applications, sub-routines, etc. may be executed by the computing system. The amount of computing resources consumed in executing the application (including the sub-applications, sub-routines, etc.) can be referred to as the workload. Some types of workloads that can be characterized by high volumes of operations can give rise to greater temperature fluctuations within the memory sub-system than workloads that are characterized by low volumes of operations.

As described in more detail in connection with FIG. 3, in some embodiments, the processing device can determine a thermal gradient between two or more of the thermal sensors 260 and/or determine a temporal gradient using at least one of the thermal sensors 260 and determine, based on the thermal gradient and/or the temporal gradient, that at least one of the circuit portion areas 256 has greater than a threshold probability of experiencing the thermal event. It is noted that in general a thermal gradient determination may require information from two or more of the thermal sensors while a temporal gradient determination may only require information from a single thermal sensor. This can be particularly useful in scenarios where the at least one of the circuit portion areas 256 is devoid of a thermal sensor 260 as a temperature for such a circuit portion area can still be determined and preventative action to remediate potentially adverse thermal effects that may be experienced by such a circuit portion area 256 can be taken. Accordingly, in some embodiments, the at least one of the circuit portion areas 256 that has greater than the threshold probability of experiencing the thermal event may not have a thermal sensor 260 resident thereon.

As discussed in more detail herein, the processing device can be configured to perform the operation to mitigate the thermal load associated with the at least one of the circuit portion areas 256 prior to the at least one of the circuit portion areas 256 experiencing the thermal event. That is, the operation to mitigate the thermal load can be performed preemptively (as opposed to reactively) prior to the at least one of the circuit portion areas 256 reaching a threshold temperature at which the circuit portion area 256 may exhibit degraded performance and/or may become damaged. Whether the circuit portion area 256 will experience such a thermal event (e.g., at a future time) can be determined in connection with the thermal map described below and/or can be determined based on the execution of one or more machine learning algorithms executed by the processing device. For example, the processing device can be configured to perform one or more machine learning algorithms to determine that the at least one of the circuit portion areas 256 has greater than the threshold probability of experiencing the thermal event.

Figure 3:
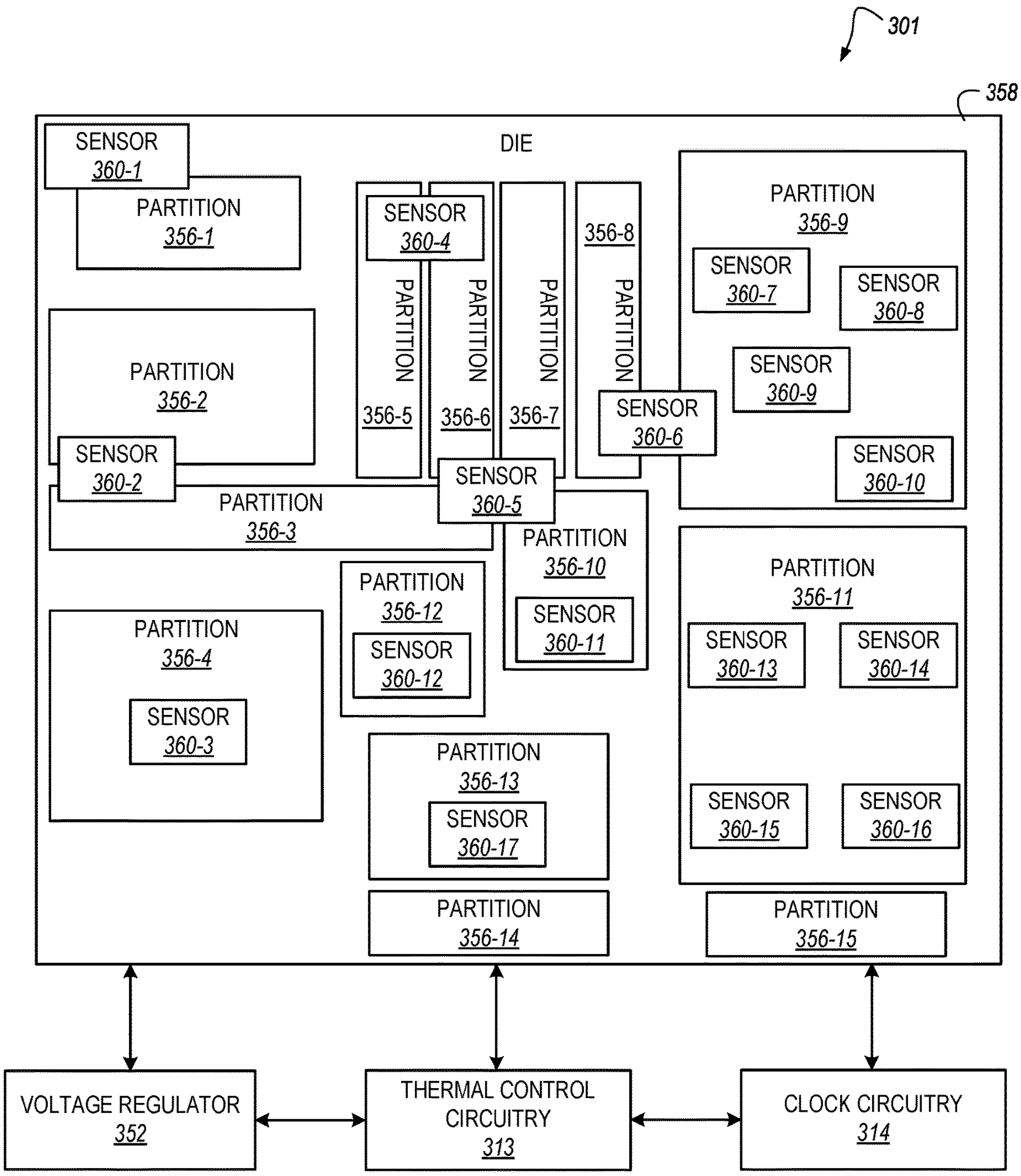
FIG. 3 illustrates another example of a thermal control system on chip in accordance with some embodiments of the present disclosure.

FIG. 3 illustrates another example of a thermal control system on chip 301 in accordance with some embodiments of the present disclosure. The example system on chip (Soc) 301, which can be referred to in the alternative as a "system" or as an "apparatus," includes a die 358, which includes various partitions 356-1, 356-2, 356-3, 356-4, 356-5, 356-6, 356-7, 356-8, 356-9, 356-10, 356-11, 356-12, 356-13, 356-14, and 356-15 (referred to collectively as the partitions 356, herein) some of which include one or more sensors 360-1, 360-2, 360-3, 360-4, 360-5, 360-6, 360-7, 360-8, 360-9, 360-10, 360-11, 360-12, 360-13, 360-14, 360-15, 360-16, and 360-17 (referred to collectively as the sensors 360, herein). The die 358 is coupled to thermal control circuity 313 and a voltage regulator 352. The partitions 356, sensors 360, thermal control circuity 313, and voltage regulator 352 can be analogous to the partitions 256, sensors 260, thermal control circuity 213, and voltage regulator 252 illustrated in FIG. 2. The die 358, as will be appreciated, comprises a piece of semiconducting material in which a plurality of integrated circuits (e.g., the partitions 356 and the sensors 360) are formed.

FIG. 3 shows a non-limiting example of how multiple partitions 356 can be provided on a single die 358. Further, it is shown in FIG. 3 that some of the partitions may have dedicated sensors 360 (e.g., sensors 360 resident on a particular partition 356), shared sensors 360 (e.g., a sensor 360 that is coupled to two or more of the partitions 356), sensors 360 that are partially resident on a partition 356, and/or partitions 356 that are devoid of sensors 360. For example, the sensor 360-1 is partially resident on the partition 356-1; the sensor 360-4 is shared between the partition 356-5 and the partition 356-6; the sensor 360-3 is resident only on the partition 356-4; and the partition 356-14 is devoid of a sensor. Other combinations of partitions 356 and sensors 360 are illustrated in FIG. 3.

As discussed above in connection with FIG. 2, the sensors 360 can be temperature sensors (e.g., thermal sensors) that are configured to detect a temperature of a partition 356 on which the sensor 360 is resident or to which the sensor 360 is coupled. For example, the sensor 360-12 can be configured to determine a temperature of the partition 356-12 on which the sensor 360-12 is resident. In some embodiments, the sensors 360 are configured to determine a temperature at a particular physical location of the partition 356 on which the sensor 360 is resident or to which the sensor 360 is coupled. For example, the sensors 360-13, 360-14, 360-15, and 360-16 can be configured to determine temperatures at different physical locations of the partition 356-11. Sensors 360 that are coupled to multiple partitions 356 can be configured to determine a temperature at a particular physical location of the partitions 356 to which the sensor 360 is coupled. For example, the sensor 360-5 can be configured to determine a temperature at a physical location of the partitions 356-6, 356-7, and 356-10.

Further, as mentioned above, the sensors 360 can be utilized to determine a thermal gradient between multiple such sensors 360 in order to determine a temperature of a partition 356 (or particular physical location on a partition 356) that is physically located between multiple such sensors 360. This is because once a heating effect begins in a certain area of the die 358, the heating can expand and/or radiate outward, thereby giving rise to a thermal gradient. For example, temperature information detected by the sensors 360-6, 360-9, and/or 360-10 can be used to generate a thermal gradient that can be used to determine a temperature at a lower leftmost corner of the partition 356-9. In another example, a thermal gradient between the sensor 360-1 and the sensor 360-2 can be generated and used to determine a temperature of the upper physical section of the partition 356-2 and/or the lower physical section of the partition 356-1. In yet another example, the sensors can be used to determine a thermal gradient associated with a single partition 356. For example, the sensors 360-6, 360-7, 360-8, 360-9, and/or 360-10 can be used to determine a thermal gradient associated with the partition 356-9.

In some embodiments, combinations of the sensors 360 can be utilized to determine thermal gradients at any physical location on the die 358 to generate a thermal map associated with the die 358. The thermal map can then be used to provide an overall understanding of the thermal behavior and/or characteristics of the die 358 at any given time. Further, the thermal map can be utilized to make predictions with respect to future thermal trends of the die 358. For example, if the thermal map indicates that a particular physical location on a partition 356 is experiencing a change (e.g., an increase) in temperature that is greater than a threshold temperature change, the thermal control circuitry 313 can cause the clock circuitry 314 to perform a preemptive protective action (e.g., by reducing the clocking frequency applied to the particular partition 356) and/or the thermal control circuitry 313 can cause the voltage regulator 352 to perform a preemptive protective action (e.g., by reducing the voltage applied to that partition 356) to remediate the increase in temperature. As mentioned above, in contrast to approaches that reactively perform thermal throttling operations, by performing a preemptive protective action, such as a thermal throttling operation, thermal events (e.g., thermal runaway, etc.) can be mitigated thereby improving the behavior and overall functioning of a computing system in which the die 358 is deployed.

The thermal map can be generated as a four-dimensional representation of the temperature behavior of the die 358 and, accordingly, of the partitions 356 deployed on the die 358. That is, the thermal map can include directionality (e.g., thermal behavior along an x-axis of the die 348, a y-axis of the die 358, and a z-axis, where the z-axis represents the temperature or a magnitude of the temperature (e.g., the thermal gradient) at a particular coordinate on the x-axis and the y-axis, which represent physical locations in a two-dimensional plane) and temporality (e.g., time corresponding to the thermal gradient) along a t-axis. It is noted that the temporal gradient can have a positive or negative value depending on whether a rate of change in the temperature over time is tending toward increasing (e.g., becoming relatively hotter) or decreasing (e.g., becoming relatively cooler) while the values along the x-axis, y-axis, and z-axis are generally always positive provided the origin of the thermal map is selected to allow for the same. Stated alternatively, the x-axis and the y-axis are dimensional axes and the z-axis corresponds to a thermal gradient at a given (x,y) coordinate, and the t-axis can represent a temporal gradient with respect to the thermal map. As mentioned above, the temporal gradient can be used in connection with the thermal gradient to predict future thermal behavior of one or more of the partitions 356 of the die 348. For example, a large thermal gradient (e.g., a large change in temperature value along the z-axis generally coupled with expanding thermal behavior along the x-axis and the y-axis) detected by the sensor 360-4 paired with a large temporal gradient may indicate that proximate partitions 356-1, 356-2, 356-3, 356-7, 356-8, and/or 356-10 may be affected in the future and may begin to heat up. Accordingly, a thermal throttling operation (e.g., application of a modified clocking signal) may preemptively performed on one or more of the partitions 356-1, 356-2, 356-3, 356-5, 356-6, 356-7, 356-8, and/or 356-10 in order to mitigate a likely future temperature increase by these partitions.

In an illustrative example, the if there are two points on the thermal map at issue: $(x_1,y_1)$ and $(x_2,y_2)$, and one of such points (e.g., $(x_1,y_1)$) has a high temperature (e.g., a large value along the z-axis), but a value of zero (or near zero) along the t-axis, it can be determined that the temperature at the location $(x_1,y_1)$ is stable because the temporal gradient (e.g., the value along the t-axis) is zero or non-zero, i.e., is vanishing or near-vanishing. In this example, suppose that the second point $(x_2,y_2)$ is rising in temperature (e.g., the point $(x_2,y_2)$ is characterized by a (positive) non-zero value along the t-axis).

There may be at least two explanations for this behavior that are determinable in accordance with the disclosure. A first explanation may be that, if the first point $(x_1,y_1)$ has experienced a temporal gradient having a value of zero (or near zero) for greater than a threshold period of time and if the second point $(x_2,y_2)$ has experienced a temporal gradient having a non-zero value for greater than a threshold period of time, then a partition 360 associated with the second point $(x_2,y_2)$ may simply be heating itself and is not incurring heat (e.g., is not the "victim" of the thermal discharge associated with the first point $(x_1,y_1)$) as the result of the first point $(x_1,y_1)$ acting as an "aggressor" with respect to the second point $(x_2,y_2)$. However, the second point $(x_2,y_2)$ may, under some conditions act as an "aggressor" to other points within the die 358 that are not considered in this simplified example based on thermal transfer throughout the die 358. That is, it can be determined from this information that a particular partition 356 that is associated with a particular thermal sensor 360 is, possibly by itself, experiencing an increased temperature and is therefore causing the non-zero thermal gradient experienced at the point $(x_2,y_2)$ at least somewhat independently of other partitions 356 on the die 358.

A second explanation for this behavior that is determinable in accordance with the disclosure may be that, if the first point $(x_1,y'_1)$ has experienced a positive temporal gradient having a value of zero (or near zero) for less than a threshold period of time and if the second point $(x_2,y_2)$ has experienced a positive temporal gradient having a non-zero value for greater than a threshold period of time, then a partition 356 associated with a thermal sensor 360 located near the first point $(x_1,y_1)$ may be acting as an "aggressor" with respect to a partition 356 associated with the second point $(x_2,y_2)$. For example, if a positive temporal gradient is detected at the point $(x_1,y_1)$ at a first time and, after some amount of time this temporal gradient can reach a steady state (e.g., the temporal gradient at the point $(x_1,y_1)$ becomes zero or close to zero), and then, at a second time after the first time (and, in some embodiments, after the temporal gradient at the point $(x_1,y_1)$ has reached the steady state), a positive temporal gradient is detected at the point $(x_2,y_2)$ it can be determined that a partition 356 associated with a thermal sensor 360 located near the first point $(x_1,y_1)$ may be acting as an "aggressor" with respect to a partition 356 associated with the second point $(x_2,y_2)$.

That is, it can be determined, using the thermal map, and, more specifically, the temporal gradient of the thermal map that, because the first point $(x_1,y'_1)$ has had a particular temperature for a certain period of time in the absence of a non-zero thermal gradient and the second point $(x_2,y_2)$ has recently detected a non-zero thermal gradient, the second point (and, hence a partition 356 associated with a thermal sensor 360 that is physically located at or near the second point $(x_2,y_2)$) is experiencing an increasing temperature as a result of the partition 356 associated with the first point being the "aggressor" for a partition 356 associated with the second point.

In other words, if the point $(x_1,y_1)$ has finished heating (i.e., the temporal gradient associated with the point $(x_1,y_1)$ is zero or close to zero), and within a relatively short period of time after this occurrence, the point $(x_2,y_2)$ begins to show signs of heating (i.e., the temporal gradient associated with the point $(x_2,y_2)$ has a positive, non-zero value), it may be determined that a partition 356 associated with a thermal sensor 360 located near the first point $(x_1,y_1)$ may be acting as an "aggressor" with respect to a partition 356 associated with the second point $(x_2,y_2)$. Stated even more simply, it can be determined, based on the foregoing, that a partition 356 associated with the first point $(x_1,y_1)$ is causing a partition 356 associated with the second point $(x_2,y_2)$ to experience an increase in temperature. In this case, a thermal throttling operation can be performed that involves the partition 356 associated with the first point or the partition that is associated with the second point, or both.

Because the thermal map is dependent on the heating profile, thermal resistance, active and/or passive cooling characteristics, adjacent hot spots, etc. of the die 358, the thermal map can be sensitive to the thermal behavior of the partitions 356 and, accordingly, the thermal behavior of the die 358 during operation of the memory sub-system. Further, these properties of the thermal map (e.g., the dimensional representation of the thermal behavior of the die 358) can allow for the thermal control circuitry 313 to analyze thermal trends of the die 358 over time to determine exact heating sources, their junction temperatures, and other valuable information to be used for the thermal, power, and performance management operations contemplated by the disclosure, particularly with respect to preemptive performance of the thermal throttling operations described herein.

As a non-limiting example, if the sensors 360 determine that there are multiple hot spots (e.g., isolated locations that are characterized by having greater than a threshold temperature) that are causing heat to radiate outward from such hot spots, the thermal map can indicate the heat radiation along an x-axis and a y-axis and a magnitude of such heat (e.g., spikes indicting the hot spots or the thermal gradient) along the z-axis corresponding to the hot spots. As mentioned above, the heat can radiate outward from these hot spots over time (e.g., along the t-axis) thereby giving rise to a temporal gradient. The temporal gradient (in connection with the thermal gradient) to determine whether to perform the preemptive thermal throttling operation described herein with respect to one or more of the partitions 356 of the die 358. In contrast, if the sensors 360 do not detect heat in certain areas of the die 358 (e.g., if the sensors 360 detect temperatures that do not exceed a threshold temperature), the thermal map can be flat (with respect to the z-axis indicating that there is no thermal gradient) and may therefore not indicate temperature locality information along the x-axis or the y-axis.

In a non-limiting example, a non-transitory computer-readable storage medium (e.g., the machine-readable medium 524 of FIG. 5) includes instructions (e.g., the instructions 526 of FIG. 5) that are executable by a processor (e.g., the thermal control circuitry 313) to cause the processor to request temperature information associated with a plurality of circuit portion areas 356 of a memory device from thermal sensors 360 coupled to at least some of the plurality of circuit portion areas 356 and process the temperature information in real time to generate a thermal map based on the measured temperature information associated with the plurality of circuit portion areas 356. The instructions can be further executed by the processor to determine, based on the thermal map, that at least one of the circuit portion areas 356 has greater than a threshold probability of experiencing the thermal event and transfer signaling indicative of the determination that the at least one of the circuit portion areas 356 has greater than the threshold probability of experiencing a thermal event to the processor to mitigate a thermal load associated with the at least one of the circuit portion areas 356 prior to the at least one of the circuit portion areas 356 experiencing the thermal event when the at least one of the circuit portion areas 356 that has greater than the threshold probability of experiencing a thermal event is devoid of a thermal sensor 360.

The instructions can be further executed by the processor to process the temperature information to determine a change in the temperature information over time as measured between two or more of the thermal sensors 360. Embodiments are not so limited, however, and in some embodiments, the instructions can be further executed by the processor to process the temperature information to determine a thermal gradient between two or more of the thermal sensors 360.

Continuing with this non-limiting example, in some embodiments, the instructions can be further executed by the processor to alter a voltage or a current applied to the at least one of the circuit portion areas 356 to mitigate the thermal load associated with the at least one of the circuit portion areas 356 prior to (e.g., preemptively) the at least one of the circuit portion areas 356 experiencing the thermal event. In other embodiments, the instructions can be further executed by the processor to alter a clocking frequency (e.g., using the clock circuitry 214 of FIG. 2) applied to the at least one of the circuit portion areas 356 to mitigate the thermal load associated with the at least one of the circuit portion areas 356 prior to (e.g., preemptively) the at least one of the circuit portion areas 356 experiencing the thermal event.

Embodiments are not so limited, however, and in some embodiments, the instructions can be executed by the processor to re-allocate a workload assigned to the at least one of the circuit portion areas 356 to mitigate the thermal load associated with the at least one of the circuit portion areas 356 prior to (e.g., preemptively) the at least one of the circuit portion areas experiencing the thermal event. For example, a workload can be re-allocated from a circuit portion area 356 that is likely to experience the thermal event to a circuit portion area that is not in danger of experiencing a thermal event.

Figure 4:
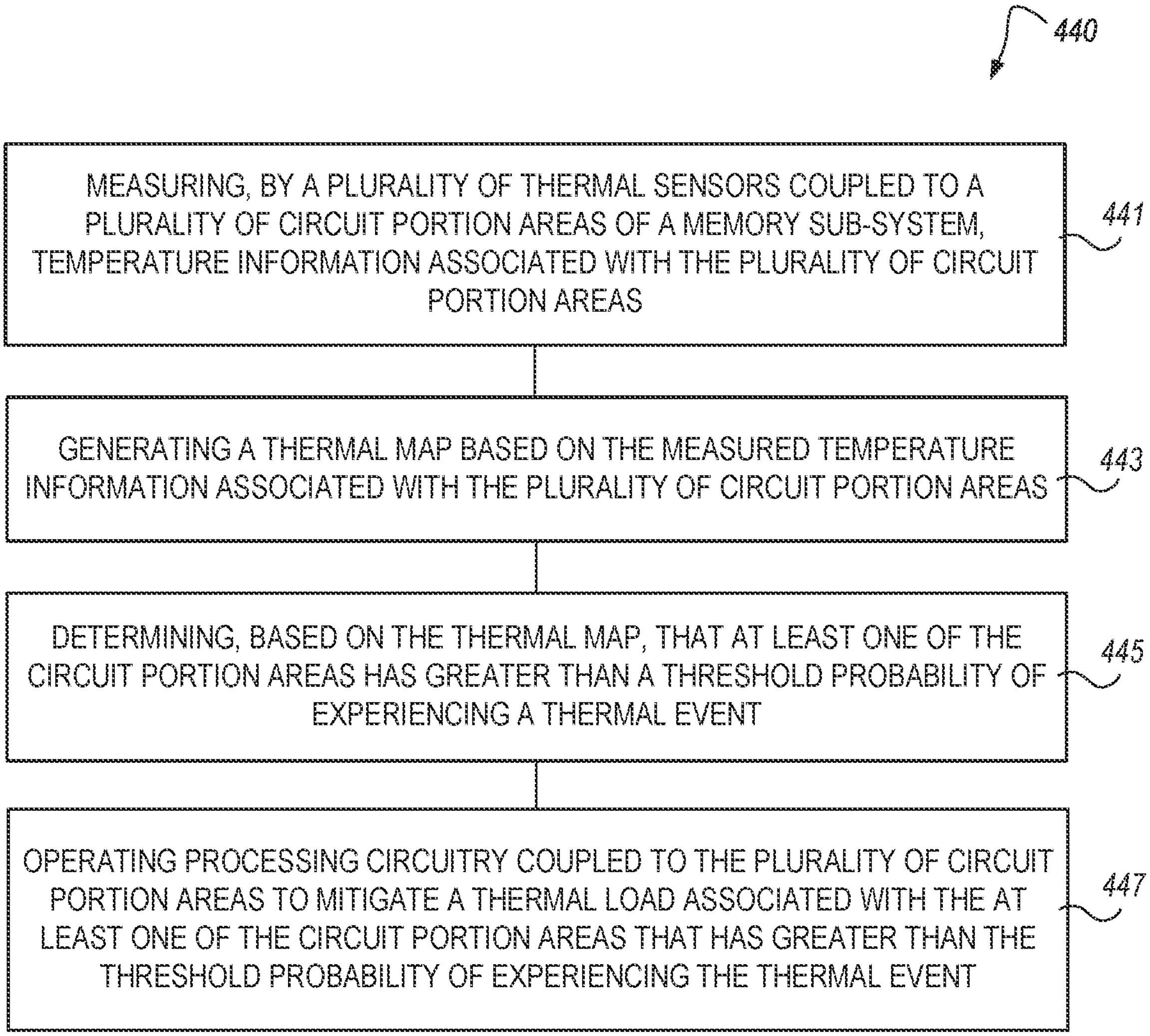
FIG. 4 is a flow diagram corresponding to a method for a thermal control system on chip in accordance with some embodiments of the present disclosure.

FIG. 4 is a flow diagram corresponding to a method 440 for a thermal control system on chip in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the thermal control circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 441, the method 440 includes measuring, by a plurality of thermal sensors coupled to a plurality of circuit portion areas of a memory sub-system, temperature information associated with the plurality of circuit portion areas. The thermal sensors can be analogous to the sensors 260/360 illustrated in FIG. 2 and FIG. 3, while the circuit portion areas can be analogous to the portions 256/356 illustrated in FIG. 2 and FIG. 3. The memory sub-system can be analogous to the memory sub-system 110 illustrated in FIG. 1. In some embodiments, the method 440 includes measuring, by at least one thermal sensor among the plurality of thermal sensors, a change in the temperature information over time.

As discussed above in connection with FIG. 3, some of the circuit portion areas can include one or more thermal sensors, some of the circuit portion areas can be devoid of a thermal sensor, and/or one or more of the thermal sensors can be coupled to multiple circuit portion areas. Accordingly, there need not be a 1:1 correspondence of thermal sensors and circuit portion areas.

At operation 443, the method 440 includes generating a thermal map based on the measured temperature information associated with the plurality of circuit portion areas. The thermal map can be generated as described above in connection with FIG. 3. Accordingly, the thermal map can include temperature information for the plurality of circuit portion areas organized in four-dimensions. Further, the thermal map can include information corresponding to the heating profile, thermal resistance, active or passive cooling, adjacent hot spots, etc. associated with the plurality of circuit portion areas. In some embodiments, the method 440 includes determining a thermal gradient between two or more of the thermal sensors and/or determine a temporal gradient using at least one of the thermal sensors as part of measuring the temperature information and generating the thermal map such that the thermal map includes the determined thermal gradient and/or temporal gradient.

At operation 445, the method 440 includes determining, based on the thermal map, that at least one of the circuit portion areas has greater than a threshold probability of experiencing a thermal event. For example, as described above, the information contained in the thermal map can be analyzed to determine whether one or more of the circuit portion areas will likely experience a thermal event (e.g., reach greater than a threshold temperature) within a given period of time. This information can then be used to preemptively perform a thermal throttling operation involving circuit portion areas that are determined to be likely to experience the thermal event, thereby improving performance of the memory sub-system, as discussed above and as described in connection with operation 447 of the method 440.

At operation 447, the method 440 includes operating processing circuitry coupled to the plurality of circuit portion areas to mitigate a thermal load associated with the at least one of the circuit portion areas that has greater than the threshold probability of experiencing the thermal event. In some embodiments, mitigating the thermal load can include performing a thermal throttling operation involving the circuit portion areas that have greater than the threshold probability of experiencing the thermal event. For example, the method 440 can include operating processing circuitry (e.g., the thermal control circuitry 113/213/313 of FIGS. 1-3) coupled to the plurality of circuit portion areas to mitigate the thermal load associated with the at least one of the circuit portion areas by altering a voltage or a current applied to the at least one of the circuit portion areas, altering a clocking frequency applied to the at least one of the circuit portion areas, and/or altering workload execution of the at least one of the circuit portion areas, among other possibilities.

In some embodiments, the method 440 includes operating processing circuitry coupled to the plurality of circuit portion areas to mitigate the thermal load associated with the at least one of the circuit portion areas prior to the at least one of the circuit portion areas experiencing the thermal event. For example, as discussed above, the method 440 can include preemptively performing a thermal throttling operation to mitigate the thermal load associated with the at least one of the circuit portion areas.

As described in connection with FIG. 3, at least one of the plurality of circuit portion areas can be devoid of a thermal sensor. In such embodiments, the method 440 can further include inferring a temperature of the circuit portion area that is devoid of the thermal sensors using at least one of the plurality of thermal sensors, as discussed above.

Figure 5:
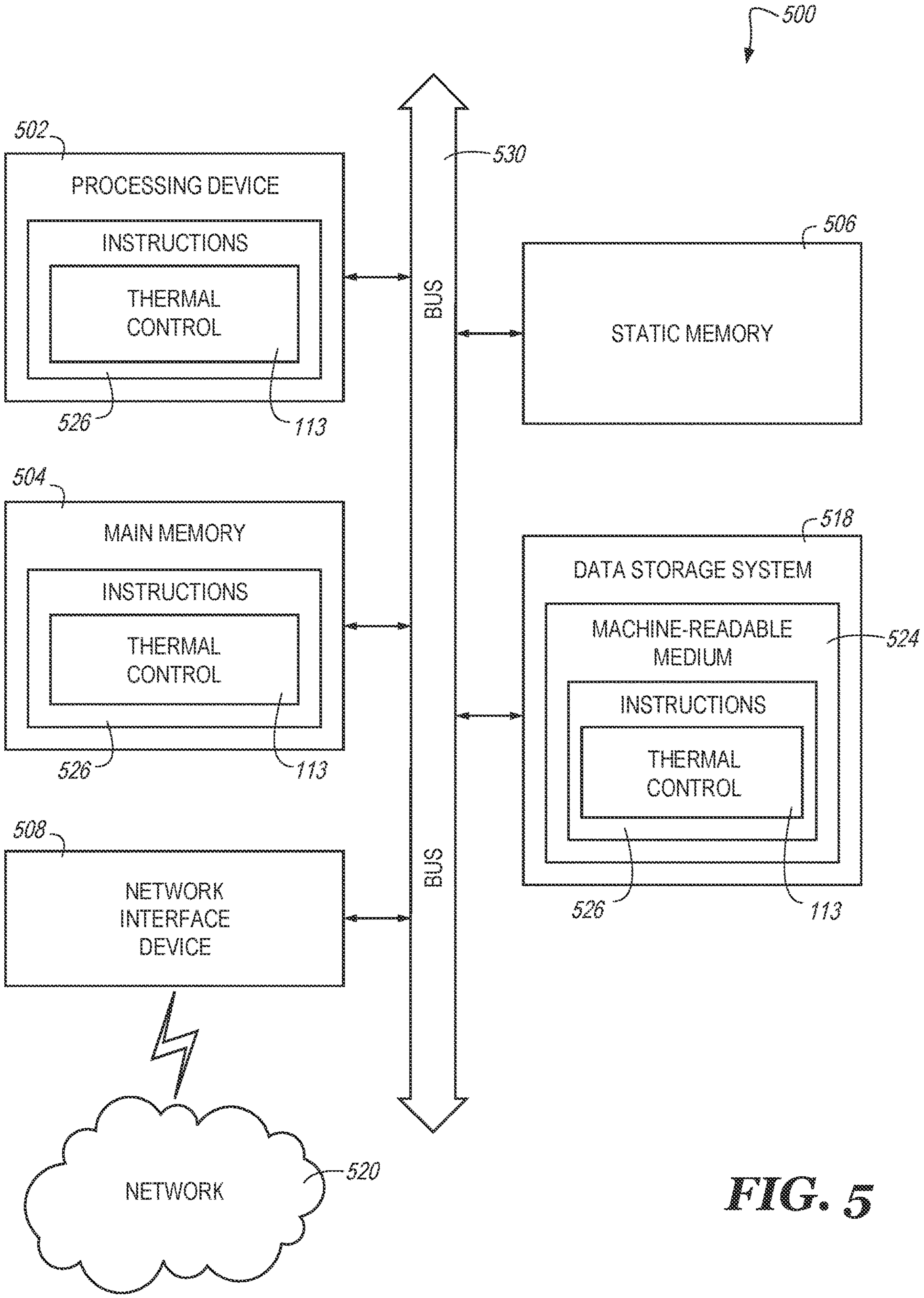
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the thermal control circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to thermal control circuitry (e.g., the thermal control circuitry 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

measuring, by a plurality of thermal sensors coupled to a plurality of circuit portion areas of a memory sub-system, temperature information associated with the plurality of circuit portion areas;

generating a thermal map based on thermal gradients determined based on a difference between temperatures at two separate sensors;

predicting thermal behavior of the plurality of thermal sensors based on the thermal map;

determining, based on the thermal map, that at least one of the circuit portion areas has greater than a threshold probability of experiencing a thermal event based on the predicted thermal behavior; and operating processing circuitry coupled to the plurality of circuit portion areas to preemptively throttle a thermal load associated with the at least one of the circuit portion areas that has greater than the threshold probability of experiencing the thermal event based on the thermal map.

2. The method of claim 1, further comprising:

measuring, by at least one thermal sensor among the plurality of thermal sensors, a change in the temperature information over time; and generating the thermal map based on the measured change in the temperature information over time.

3. The method of claim 1, further comprising operating processing circuitry coupled to the plurality of circuit portion areas to mitigate the thermal load associated with the at least one of the circuit portion areas by:

altering a voltage or a current applied to the at least one of the circuit portion areas, altering a clocking frequency applied to the at least one of the circuit portion areas, or altering workload execution for the at least one of the circuit portion areas, or any combination thereof.

4. The method of claim 1, wherein at least one of the plurality of circuit portion areas is devoid of a thermal sensor and wherein the method further comprises inferring a temperature of the circuit portion area that is devoid of the thermal sensors using at least one of the plurality of thermal sensors.

5. The method of claim 1, further comprising operating processing circuitry coupled to the plurality of circuit portion areas to mitigate the thermal load associated with the at least one of the circuit portion areas prior to the at least one of the circuit portion areas experiencing the thermal event.

6. An apparatus, comprising:

a plurality of circuit portion areas resident on a memory sub-system; and a plurality of thermal sensors coupled to at least some of the plurality of circuit portion areas, wherein the plurality of thermal sensors measure temperature information associated with at least one of the plurality of circuit portion areas; and processing circuitry coupled to the plurality of thermal sensors and the plurality of circuit portion areas, wherein the processing circuitry is configured to:

generate a thermal map based on thermal gradients determined based on a difference between temperatures at two separate sensors;

predict thermal behavior of the plurality of thermal sensors based on the thermal map;

determine, based on the thermal map, that at least one of the circuit portion areas has greater than a threshold probability of experiencing a thermal event; and perform an operation to preemptively throttle a thermal load associated with the at least one of the circuit portion areas that has greater than the threshold probability of experiencing the thermal event based on the thermal map.

7. The apparatus of claim 6, wherein:

the processing circuitry comprises a voltage regulator, and the operation to preemptively throttle the thermal load associated with the at least one of the circuit portion areas that has greater than the threshold probability of experiencing the thermal event comprises an operation performed by the voltage regulator to alter a voltage or a current applied to the at least one of the circuit portion areas.

8. The apparatus of claim 6, wherein the operation to mitigate the thermal load associated with the at least one of the circuit portion areas that has greater than the threshold probability of experiencing the thermal event comprises an operation to alter a clocking frequency applied to the at least one of the circuit portion areas.

9. The apparatus of claim 6, wherein the processing circuitry is configured to:

determine that the thermal load is indicative of a workload executed by the at least one of the circuit portion areas; and the operation to preemptively throttle the thermal load associated with the at least one of the circuit portion areas that has greater than the threshold probability of experiencing the thermal event comprises an operation to alter a workload allocation to the at least one of the circuit portion areas.

10. The apparatus of claim 6, wherein the processing circuitry is configured to:

determine a thermal gradient, between two or more of the thermal sensors or a temporal gradient using at least one of the thermal sensors; and determine, based on the thermal gradient or the temporal gradient, or both, that at least one of the circuit portion areas has greater than a threshold probability of experiencing the thermal event.

11. The apparatus of claim 10, wherein the at least one of the circuit portion areas that has greater than the threshold probability of experiencing the thermal event does not have a thermal sensor resident thereon.

12. The apparatus of claim 6, wherein the processing circuitry is configured to perform the operation to preemptively throttle the thermal load associated with the at least one of the circuit portion areas prior to the at least one of the circuit portion areas experiencing the thermal event.

13. The apparatus of claim 6, wherein the processing circuitry is configured to perform one or more machine learning algorithms to determine that the at least one of the circuit portion areas has greater than the threshold probability of experiencing the thermal event.

14. A non-transitory computer-readable storage medium comprising instructions that, when executed by a processor, cause the processor to:

request temperature information associated with a plurality of circuit portion areas of a memory device from thermal sensors coupled to at least some of the plurality of circuit portion areas;

process the temperature information in real time to generate a thermal map based on thermal gradients determined based on a difference between temperatures at two of the thermal sensors;

predicting thermal behavior of the plurality of thermal sensors based on the thermal map;

determine, based on the thermal map, that at least one of the circuit portion areas has greater than a threshold probability of experiencing a thermal event;

transfer signaling indicative of the determination that the at least one of the circuit portion areas has greater than the threshold probability of experiencing the thermal event to the processor to preemptively throttle a thermal load associated with the at least one of the circuit portion areas prior to the at least one of the circuit portion areas experiencing the thermal event based on the thermal map, wherein the at least one of the circuit portion areas that has greater than the threshold probability of experiencing the thermal event is devoid of a thermal sensor.

15. The medium of claim 14, wherein the instructions, when executed by the processor, cause the processor to process the temperature information to determine a thermal gradient between two or more of the thermal sensors.

16. The medium of claim 14, wherein the instructions, when executed by the processor cause the processor to alter a voltage or a current applied to the at least one of the circuit portion areas to preemptively throttle the thermal load associated with the at least one of the circuit portion areas prior to the at least one of the circuit portion areas experiencing the thermal event.

17. The medium of claim 14, wherein the instructions, when executed by the processor cause the processor to re-allocate a workload assigned to the at least one of the circuit portion areas to preemptively throttle the thermal load associated with the at least one of the circuit portion areas prior to the at least one of the circuit portion areas experiencing the thermal event.

18. The medium of claim 14, wherein the instructions, when executed by the processor cause the processor to alter a clocking frequency applied to the at least one of the circuit portion areas to mitigate the thermal load associated with the at least one of the circuit portion areas prior to the at least one of the circuit portion areas experiencing the thermal event.

* * * * *